United States Patent [19]
Danielson

[11] Patent Number: 5,459,294
[45] Date of Patent: Oct. 17, 1995

[54] WIRELESS FLOATING HORN SWITCH

[75] Inventor: David J. Danielson, Hamilton, Ill.

[73] Assignee: Methode Electronics, Inc., Chicago, Ill.

[21] Appl. No.: 276,243

[22] Filed: Jul. 18, 1994

Related U.S. Application Data

[63] Continuation of Ser. No. 916,594, Jul. 20, 1992, Pat. No. 5,331,124.

[51] Int. Cl.$^6$ ........................................ H01H 9/00
[52] U.S. Cl. .................... 200/61.54; 200/61.56
[58] Field of Search .................... 200/61.54–61.57

[56] References Cited

U.S. PATENT DOCUMENTS

| | | | |
|---|---|---|---|
| 4,785,144 | 11/1988 | Fosnaugh et al. | 200/61.55 |
| 5,085,462 | 2/1992 | Gualtier | 280/731 |
| 5,193,412 | 3/1993 | Hashiba | 74/552 |
| 5,235,146 | 8/1993 | Suzuki | 200/61.54 |
| 5,303,952 | 4/1994 | Shermetaro et al. | 280/731 |
| 5,327,796 | 7/1994 | Ernst et al. | 74/484 H |

FOREIGN PATENT DOCUMENTS

4034539A1  5/1991  Germany ................ B60Q 5/00

Primary Examiner—Kristine L. Kincaid
Assistant Examiner—Michael A. Friedhofer
Attorney, Agent, or Firm—David L. Newman

[57]  ABSTRACT

A base insert, a wireless floating horn switch including an insulated insert, and a steering wheel assembly including the wireless floating horn switch are provided. The wireless floating horn switch is constructed so that it operates in association with an air-bag assembly to actuate a horn circuit including an insulated base insert, a horn circuit connector, an attaching assembly for uniting an air-bag mounting bracket with the insulated base insert, a spring for urging the mounting bracket away from the insulated base insert, a contact and an activator for urging the contact to complete the horn circuit.

13 Claims, 4 Drawing Sheets

WIRELESS FLOATING HORN SWITCH

This is a continuation of application Ser. No. 07/916,594, filed Jul. 20, 1992, now U.S. Pat. No. 5,331,124.

BACKGROUND OF THE INVENTION

(1) Field of the Invention

This invention concerns an electrically conductive base insert for use in a wireless floating horn switch assembly. The wireless floating horn switch is installed on a steering wheel and an air bag is installed to the wireless floating horn switch assembly. The switch allows the horn to be activated by pressing the air bag assembly. This invention also includes a steering wheel assembly comprising the wireless floating horn switch of this invention.

(2) Description of the Art

Traditional steering wheels include horn activators that are located in the center of or around the periphery of a steering wheel. The horn circuit is activated by pressing the center of the steering wheel or by pressing the horn actuator. With the advent of steering wheel mounted air-bags however, automobile horns were moved to discrete small buttons located towards the periphery of the steering wheel because the air-bag occupies all the space in the center of the steering wheel. There was a need, therefore, for a horn that could be actuated by pressing the center region of a steering column containing an air-bag.

The inventor became aware of the need for a center region actuated horn circuit complementary to an air-bag assembly when he was presented with a potential design for a wireless floating horn switch. The circuit disclosed to the inventor included a top circuit integral to a bracket cooperative with the air-bag assembly and a separate bottom circuit. When the top and bottom circuits were united, the horn sounded.

SUMMARY OF THE INVENTION

It is an object of this invention to provide a horn switch wherein all of the horn circuitry is incorporated into a single piece wireless floating horn switch.

It is another object of this invention to provide an electrically conductive base insert comprising the horn circuitry and optional auxiliary circuits.

It is still another object of this invention to provide a wireless floating horn switch that is cooperative with an air-bag assembly and that is center actuated.

It is another object of this invention to provide a wireless floating horn switch that is cheaply made, modular, and easily replaced.

It is still another object of this invention to provide a wireless floating horn switch that is complementary to an air-bag but which is isolated from the air-bag circuitry.

In one embodiment, this invention is an electrically conductive base insert for use in a wireless floating horn switch. The electrically conductive base insert comprises a flat electrical conductor including a horn circuit having at least one access pad, and a ground circuit. The electrically conductive base insert includes a plurality of tie-ins uniting the ground circuit and the horn circuit to stabilize the base insert. Additionally, the electrically conductive base insert may include one or more auxiliary circuits.

In another embodiment, this invention is a wireless floating horn switch assembly. The wireless floating horn switch assembly includes an insulated electrically conductive base insert having a horn circuit with one or more exposed access pads, and a ground circuit. The wireless floating horn switch also includes a connector associated with both the horn circuit and the ground circuit. The connector unites the horn switch with the horn, with a source of electricity, and with a ground circuit. A bracket is movably attached to the base insert with at least one attaching assembly. The attaching assembly includes a bolt complementary to an aperture in the insulated electrically conductive base insert. A spring contacts the insulated electrically conductive base insert and the bracket to urge the bracket away from the insulated electrically conductive base insert. The spring is stabilized by the bolt. When installed in a steering wheel and pressed, the bracket moves toward the base insert thereby depressing the spring. The wireless floating horn switch is attached to a steering wheel by an attaching means. Preferably the attaching means is the same bolt that is used in the attaching assembly to attach the bracket to the base insert. The wireless floating horn switch also includes a contact complementary to each exposed access pad. The contact includes one or more tabs which are in continuous contact with the ground circuit, and a means capable of reversibly striking an exposed access pad. Finally, the wireless floating horn switch includes an activator responsive to the movement of the moveable bracket. The activator urges the contact means into electrical communication with an exposed access pad. When the contact strikes the exposed access pad, the horn circuit is completed activating the horn.

In another embodiment, this invention is a steering wheel assembly. The steering wheel assembly includes a steering wheel, a wireless floating horn switch, and an air-bag assembly. The steering wheel includes a plurality of centrally located apertures complementary to the wireless floating horn switch. The wireless floating horn switch is attached to the steering wheel with partially threaded bolts which pass through the bracket and the insulated electrically conductive base insert of the wireless floating horn switch and thread into the centrally located apertures in the steering wheel. The wireless floating horn switch includes an insulated electrically conductive base insert having a horn circuit with one or more exposed access pads, a ground circuit and an optional auxiliary circuit. A connector is associated with both the horn circuit and the ground circuit. A bracket complementary to an air bag assembly is movably associated with the insulated electrically conductive base insert. The wireless floating horn switch is attached to the steering wheel with a plurality of partially threaded bolts each which pass through an aperture the bracket and the switch and which are threaded into the steering wheel. A spring divides and contacts the bracket and the insulated electrically conductive base insert. The spring acts to urge the bracket away from the base insert. A contact is complementary to each exposed access pad. The contact continuously contacts the ground circuit and includes a means operative with an actuator for reversibly striking the exposed access pad. The actuator is responsive to the movement of the reversible bracket and urges the contact into communication with the exposed access pad when the bracket is urged towards the base insert. The actuator is made of an electronically insulating material. The actuator is associated with a bracket aperture to insulate each spring from the metal bracket and to insulate each bolt from the metal bracket. Finally, the steering wheel includes an air bag assembly attached to the bracket with a plurality of attaching means.

DESCRIPTION OF THE DRAWINGS

There is shown in the drawings a presently preferred embodiment of the wireless floating horn switch of this invention wherein like numerals in the various figures pertain to like elements and wherein.

DESCRIPTION OF THE CURRENT EMBODIMENT

The present invention relates to a novel electronically conductive base insert useful in a wireless floating horn switch, a wireless floating horn switch incorporating the base insert, and a steering wheel assembly including a steering wheel, the wireless floating horn switch of this invention, and an air-bag assembly. The base insert and wireless floating horn switch of this invention are better understood by reference to FIGS. 1 through 6 which depict various aspects of a preferred base insert and wireless floating horn switch of this invention.

Figure 4:
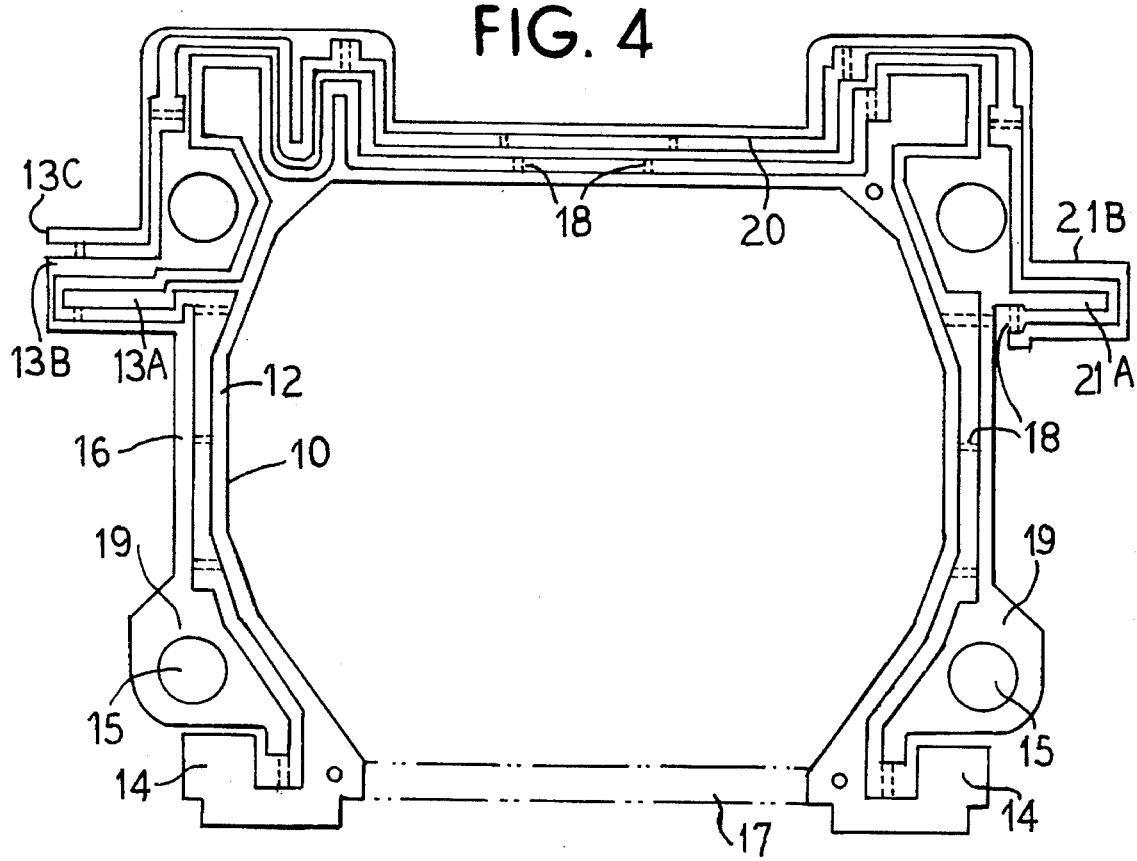
FIG. 4 depicts a base insert of this invention.

FIG. 4 shows a base insert of this invention. Base insert 10 includes horn circuit 12, ground circuit 16 and optional auxiliary circuit 20. Base insert 10 also includes horn circuit connector tines 13A–13C. Tine 13A corresponds to the horn circuit, tine 13B corresponds to the ground circuit and tine 13C corresponds to the auxiliary circuit. Base insert 10 also includes an auxiliary circuit connector tines 21A–21B. Tine 21A corresponds to ground circuit 16 and tine 21B corresponds to auxiliary circuit 20.

Base insert 10 is the "circuit" portion of the wireless floating horn switch of this invention. Base insert 10 is manufactured from an electrically conductive material such as copper, bronze or a conductive metal alloy. Preferably, base insert 10 of this invention is manufactured from Phosphor-Bronze Alloy No. 510. Base insert 10 of this invention has a thickness sufficient to prevent any warping prior to and while insulating base insert 10 with an insulating material. However, it is also desirable to limit the thickness of base insert 10 to minimize the amount and cost of the alloy used to manufacture the base insert. It is preferred that base insert 10 have a thickness of from about 0.010 to 0.015 inches.

Tie-ins 18 are associated with the uninsulated base insert 10. Tie-ins 18 temporarily unite the various circuits making up base insert 10 in order to add rigidity to base insert 10. Additionally, tie-ins 18 provide points where base insert 10 can be grasped during the base insert insulating process. When base insert 10 is insulated, the tie-ins 18 are obliterated by drilling or by any other means capable of obliterating tie-ins 18.

Stabilizing bar 17 is also associated with the uninsulated base insert 10. Stabilizing bar 17 helps to keep uninsulated base insert 10 from warping or bending during base insert insulation. Stabilizing bar 17 is not insulated and once base insert 10 is insulated with an insulating material, stabilizing bar 17 is removed.

Horn circuit 12 of base insert 10 includes a plurality of access pads 14. Access pads 14 remain exposed after base insert 10 is insulated and provide a location at which the horn circuit can be completed.

Ground circuit 16 includes a plurality of ground pads 19. Each ground pad 19 is located adjacent to an access pad 14. The purpose of ground pad 19 is to provide a location adjacent to an access pad 14 where the horn circuit is completed by electronically uniting horn circuit 12 and ground circuit 16.

Base insert 10 may include one or more auxiliary circuits. An auxiliary circuit is typically associated with an electronic device located on the steering wheel. Such auxiliary electronic devices include cruise control circuitry, cruise control backlighting circuitry, air bag circuitry, or any other circuitry associated with a steering wheel. The number of auxiliary circuits included in base insert 10 is limited only by the base insert size constraints resulting from the design and size of the steering wheel in which the wireless floating horn switch of this invention will be installed.

Ground pads 19 include an aperture 15. Aperture 15 is complementary to the location of threaded apertures on a steering wheel. An attaching means will pass through aperture 15 and will unite the wireless floating horn switch with the steering wheel. It is not required that aperture 15 be associated with ground pad 19. The circuit that has been being defined above as ground circuit 16 could alternatively be horn circuit 12 while horn circuit 12 could alternatively be ground circuit 16. What is required is that base insert 10 includes at least a horn circuit 12 and a ground circuit 16, with one circuit including access pads adjacent to aperture containing pads associated with the other circuit.

Figure 6:
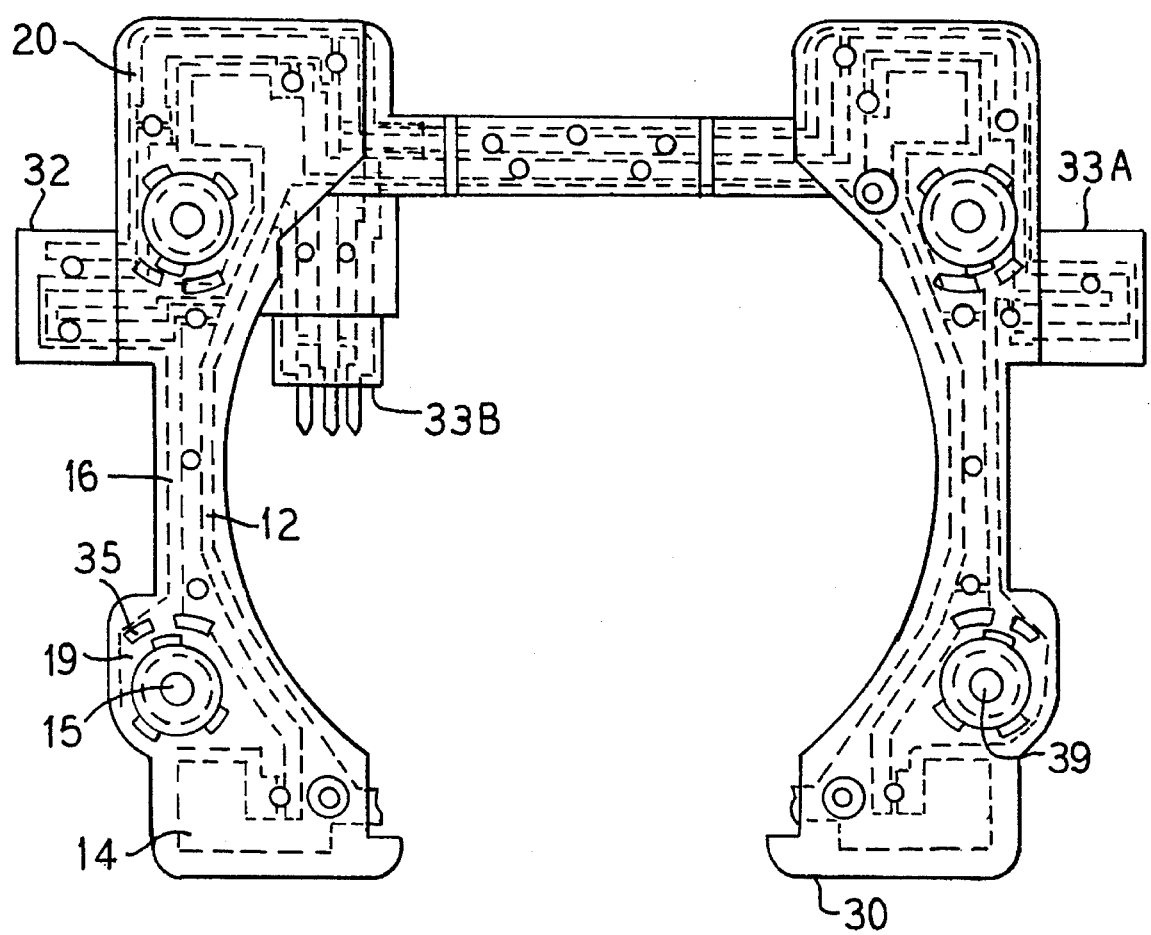
FIG. 6 is an overhead view of an insulated base insert of this invention.

Base insert 10 is covered with an electrically inert insulating material to define an insulated base insert 30 shown in FIG. 6. The insulating material should be a material that is capable of curing into a rigid material thereby providing the insulated base insert 30 with structural integrity. Any rigid electrically inert plastic or thermoplastic material can be used as the insulating material. It is preferred that the insulating material is glass filled, low shrinkage polymer, and preferably glass filled polyester PBT.

Insulated base insert 30 will include an aperture associated with each tie-in 18. Additionally, stabilizing bar 17 will remain uninsulated. At this point, each tie-in 18 will be obliterated by drilling or by some other means, and stabilizing bar 17 will be cut from insulated base insert 30. Once all tie-ins are obliterated, ground circuit 16, horn circuit 12 and auxiliary circuit 20 are electrically isolated from one another in insulated base insert 30. FIG. 6 depicts an insulated base insert 30 ready for use in a wireless floating horn circuit of this invention with obliterated tie-ins 18 and with stabilizing bar 17 removed.

FIGS. 1–3 and 5–6 show various aspects of the wireless floating horn switch of this invention. The wireless floating horn switch 25 of this invention includes an insulated base insert 30 having a plurality of exposed access pads 31. Additionally, insulated base insert includes horn connector 32 and auxiliary connector 33. Wireless floating horn switch 25 also includes attaching assembly 34 including bolt 36 which passes through first aperture 38 in a mounting bracket 42. Actuator 48 made of an electrically insulating material is associated with first aperture 38 so that bolt 36 is electrically insulated from metal mounting bracket 42. Generally, actuator 48 will include a sleeved aperture complementary to first aperture 38 that electrically insulates the inner dimension of first aperture 48. After passing through first aperture 38, bolt 36 passes through second aperture 39 in insulated base insert 30. Spring 40 is located between mounting bracket 42 and insulated base insert 30. Contact 44 is continuously associated with ground circuit 16 of insulated base insert 30.

Contact 44 also includes a means for completing the horn circuit that is responsive to the movement of mounting bracket 42 towards insulated base insert 30. Finally, actuator 48 is associated with mounting bracket 42. Actuator 48 is an insulator. It acts to electrically insulate bolt 36 and spring 40 from metal mounting bracket 42. Actuator 48 also works in cooperation with movement of mounting bracket 42 towards insulated base insert 30 to cause contact 44 to complete the horn circuit. When the horn circuit is completed, the horn sounds.

Insulated base insert 30 includes base insert 10 surrounded by rigid insulating material. Insulated base insert 30 includes a plurality of exposed access pads 31. The exposed access pads 31 are associated with horn circuit 12 but may alternatively be associated with ground circuit 16. The purpose of exposed access pad 31 is to provide a location at which the horn circuit can be completed by means of contact 44 external to insulated base insert 30. Additionally, insulated base insert 30 includes an aperture 39 complementary to each aperture 15 in ground pad 19. Each aperture 39 is also complementary to bolt 36 which passes through aperture 39 and which attaches to a steering wheel. Insulated base insert 30 also includes a plurality of tab holes 35 associated with each ground pad 19. Tab holes 35 pass through the insulating material and expose a portion of ground pad 19. Tabs 46 integral to contact 44 pass through tab holes 35 and contact ground pad 19.

It is not necessary that exposed access pad 31 are associated with horn circuit 12 or that tab holes 35 are associated with ground circuit 16. It is necessary that both horn circuit 12 and ground circuit 16 each include some type of means for completing the horn circuit. In the preferred embodiment, that means is contact 44 which reversibly unites the horn and ground circuits.

Insulated base insert 30 includes at least one horn connector 32, and may include one, two or more optional auxiliary connector 33. Horn connector 32 includes cover 37 which is complementary to a connector associated with a source of electricity and the horn. Cover 37 provides a means to lock the complementary connector to the wireless floating horn switch, and it also insulates and protects the connector from other electrical connections. Horn connector 32 includes three tines. One tine is associated with a source of electricity, a second tine is associated with the horn circuit and a third tine is associated with the ground circuit. Auxiliary connector 33 includes at least two tines, a tine associated with the ground circuit and a tine associated with an auxiliary device such as cruise control or some other device.

Wireless floating horn switch 25 includes one or more mounting brackets 42. Mounting bracket 42 serves at least two functions. First, mounting bracket 42 includes apertures complementary to an air-bag assembly. An air-bag assembly is attached to the apertures on mounting bracket 42 with an attaching means such as a bolt. To secure the air bag assembly to a steering wheel. It is preferred that mounting brackets 42 are made of a metal or a metal inserted plastic member to provide a solid mounting surface for the air bag assembly.

Mounting bracket 42 is also movably associated with insulated base insert 30 by means of spring 40. Spring 40 urges mounting bracket 42 away from insulated base insert 30. Mounting bracket 42 can be moved towards insulated base insert 30 by applying pressure to mounting bracket 42 or to the air bag assembly associated with mounting bracket 42. Typically, pressure is applied to mounting bracket 42 by pushing on an air-bag assembly associated with the mounting bracket 42.

Mounting bracket 42 may be a one-piece bracket, it may be a two-piece bracket or it may have three or more pieces depending on the configuration of the insulated base insert 30, the air bag assembly and the steering wheel. Preferably, mounting bracket 42 includes a right bracket 42A and a left bracket 42B. A multiple piece mounting bracket allows the horn circuit to be activated by applying downward force to any portion of an air bag attached to the mounting bracket. A single piece mounting bracket, while effective in activating the horn circuit, will require a greater center pressure to activate the horn.

Mounting bracket 42 also provides a base for an air-bag assembly. Additionally, mounting bracket 42 orients the air-bag assembly so that it is properly located to the steering wheel. Finally, mounting bracket 42 provides a base for movably securing the wireless floating horn switch 25 to a steering wheel.

Wireless floating horn switch 25 includes at least one attaching assembly 34, for stabilizing mounting bracket 42 and uniting wireless floating horn switch 25 with a steering wheel. Attaching assembly 34 will typically be a threaded bolt 36 or an equivalent attaching device. Bolt 36 passes through first aperture 38 of mounting bracket 42 and through second aperture 29 of insulated base insert 30, and is threaded into a threaded aperture associated with a steering wheel. Bolt 36 may be threaded through aperture 39. Bolt 36 however, is not threaded through insulated first aperture 37 associated with mounting bracket 42. Mounting bracket 42 must be able to move freely towards insulated base insert 30. Threading bolt 36 to mounting bracket 42 would inhibit the movement of mounting bracket 42.

Bolt 36 includes a bolt head 41. Bolt head 41 contacts the face of mounting bracket 42 to and prevents mounting bracket 42 from being completely urged away from insulated base insert 30 by spring 40. Bolt head 41 is separated from mounting bracket 42 with washer 43 which is electrically inert. Washer 43 is preferably manufactured of a soft electric and sound insulating material such as silicone rubber. Washer 43 prevents bolt 36 and mounting bracket 42 from contacting and making noise.

Preferably, bolt 36 is partially threaded and aperture 39 is associated with insulated base insert 30 and is also threaded. Prior to installation in a steering wheel, bolt 36 will be threaded in aperture 39.

The threads have nothing to do with movement of mounting bracket 42. Bracket 42 moves on the large diameter of bolt 36.

Wireless floating horn switch 25 includes contact 44. Contact 44 is the means for intermittently and reversibly uniting ground circuit 16 with horn circuit 12 to actuate the automobile horn. Contact 44 intermittently activates the horn circuit by remaining in continuous contact with either horn circuit 12 or ground circuit 16 and providing a means for intermittently contacting the alternate circuit. In the embodiment depicted in FIG. 2, 3 and 5, contact 44 continuously contacts ground pad 19 via a plurality of tabs 46. Tabs 46 pass through tab holes 35 in insulated base insert 30 and continuously contact ground circuit 16 at ground pad 19.

Figure 1:
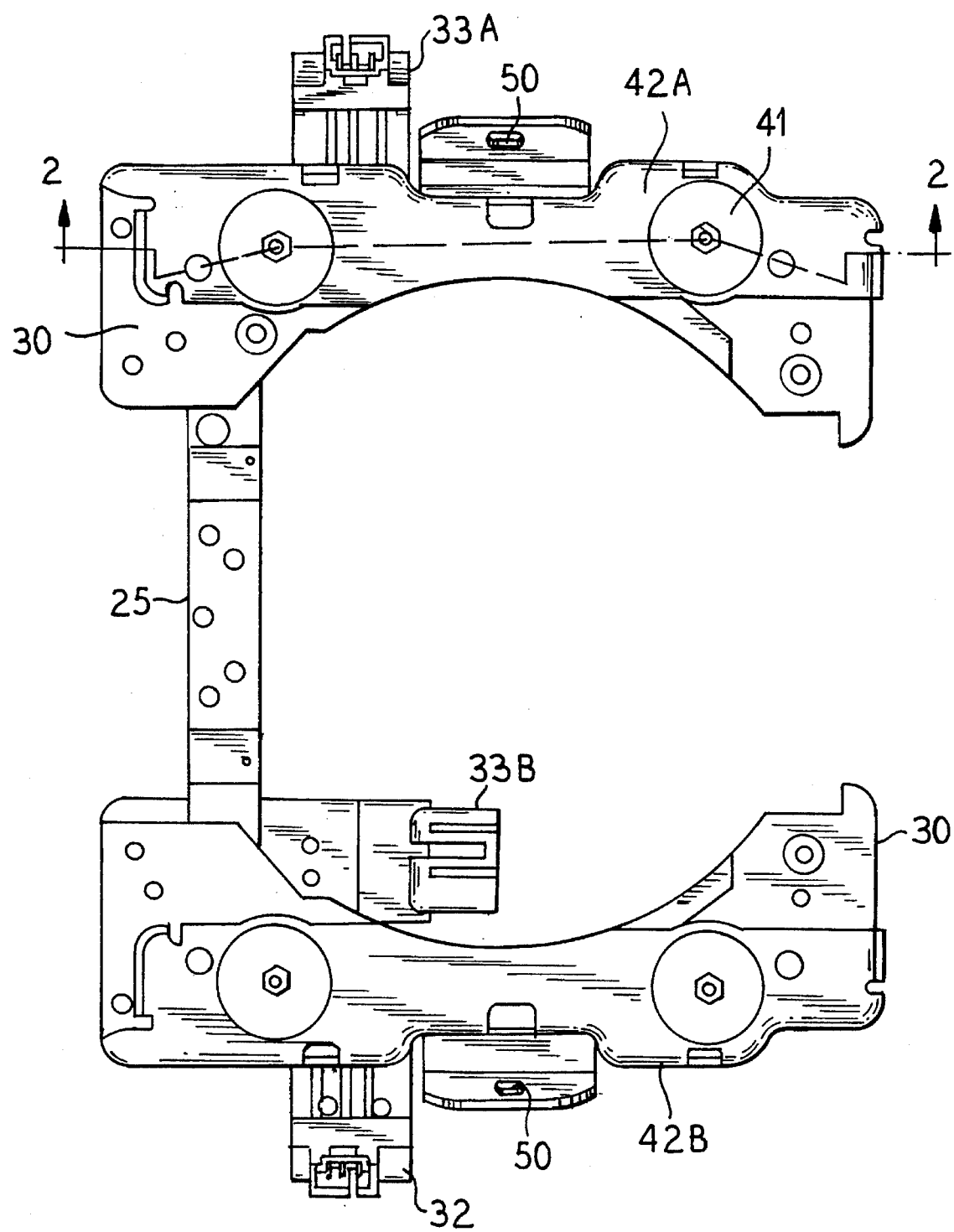
FIG. 1 is an overhead view of a wireless floating horn switch of this invention.
Figure 2:
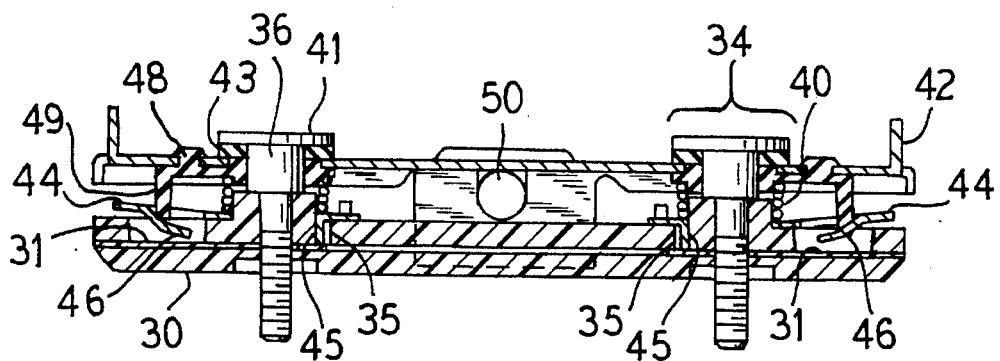
FIG. 2 is a side view of wireless floating horn switch of this invention in an unactuated position.
Figure 3:
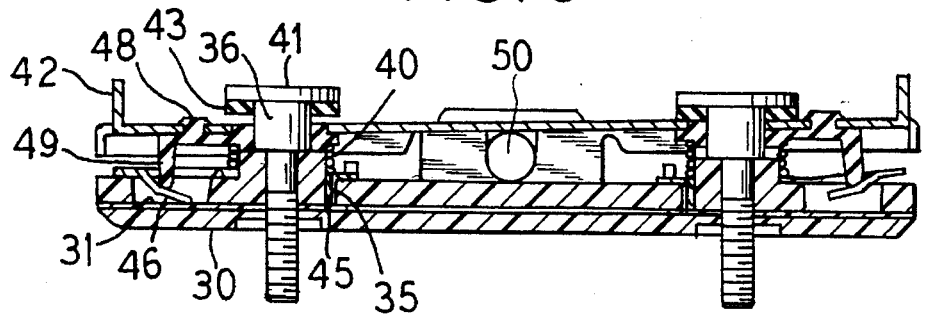
FIG. 3 is a side view of the wireless floating horn switch of this invention showing the horn circuit in an actuated position.
Figure 5:
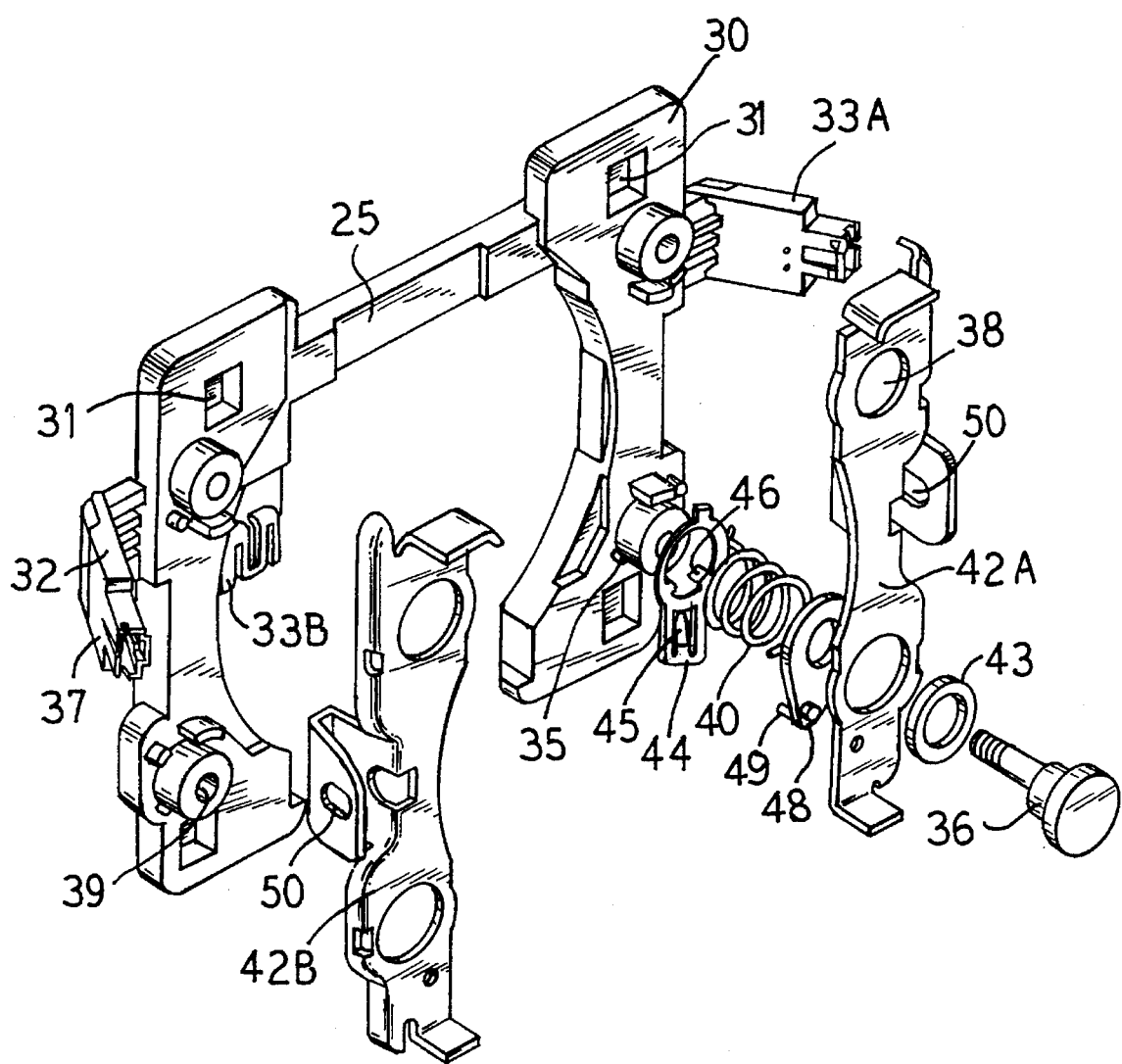
FIG. 5 is an exploded view of a wireless floating horn switch of this invention.

The preferred contact 44 of this invention, as shown in FIGS. 2, 3 and 5, includes arm 45 which incorporates a moveable contact means for reversibly completing the horn circuit when actuated by actuator 48. Arm 45 of contact 44 is preferably a cantilever arm or a spring arm. Arm 45 is oriented so that it contacts an exposed access pad 31 associated with the horn circuit when actuated by actuator 48. Contact 44 is manufactured out of an electrically conductive material such as copper, bronze, Phosphor-Bronze Alloy No. 510, or any other metal or alloy that is electrically conductive.

It is anticipated that contact 44 may not continuously contact either ground circuit 16 or horn circuit 12 but will include two means for reversibly and simultaneously contacting both ground circuit 16 and horn circuit 12. Such means may include spring arms as described above, the spring arms being forced into contact with the circuits by an activator associated with both spring arms.

Spring 40 located between mounting bracket 42 and insulated base insert 30 urges mounting bracket 42 away from insulated base insert 30. Spring 40 may be associated with mounting bracket 42 in any manner known in the art that will allow spring 40 to urge mounting bracket 42 away from insulated base insert 30.

Preferably, spring 40 is a helical coil spring which encompasses each bolt 36 associated with each attaching assembly 34. When installed on a steering wheel, bolt 36 will be threaded into place in the steering wheel and will pass through the center of and partially compress each spring 40. Thus, spring 40 will always be under tension caused by mounting bracket 42.

Preferably, spring 40 will hold contact 44 in place by urging contact 44 into contact with insulated base insert 30. Additionally, the size of spring 40 will determine the amount of pressure required to activate the horn. A weak spring will mean that little pressure will be required to activate the horn while a strong spring will require a greater amount of pressure to be applied on mounting bracket 42 to actuate the horn.

Finally, wireless floating horn switch 25 includes actuator 48. Actuator 48 includes a means for inducing contact 44 to reversibly unite horn circuit 12 with ground circuit 16 to actuate a horn when mounting bracket 42 is moved towards insulated base insert 30. The preferred actuator 48 is manufactured of an electrically inert material such as plastic and it is installed on mounting bracket 42 integral to each aperture 38.

Actuator 48 preferably includes a pin 49 complementary to spring arm 45 of contact 44. Actuator 48 is integral to or is forced by spring 40 into contacts with mounting bracket 42. The movement of mounting bracket 42 towards insulated base insert 30 causes pin 49 to contact spring arm 46 and urge spring arm 46 into contact with exposed access pad 31 thereby uniting horn circuit 12 and ground circuit 16 to activate the horn.

Actuator 48 insulated bolt 36 and spring 40 from mounting bracket 42. Actuator 48 typically will include a base piece with a sleeved aperture complementary to aperture 38 in mounting bracket 42 and a pin 49. Actuator aperture 48 is complementary to aperture 38 and to bolt 36. The base of actuator 48 remains in continuous contact with mounting bracket 42 while pin 49 of actuator 48 is oriented perpendicular to the actuator base. Pin 49 will typically be located directly adjacent to an exposed access pad 31. Contact 44 will lie between pin 49 and exposed access pad 31. The length of pin 49 will be selected so that pin 49 reversibly forces contact 44 into contact with exposed access pad 31 without deforming contact 44.

Wireless floating horn switch 25 of this invention is useful in association with a steering wheel assembly including a steering wheel, a wireless floating horn switch, and an air bag assembly. Wireless floating horn switch 25 is attached to the steering wheel with at least one attaching means. Preferably the attaching means used to attach the wireless floating horn switch to the steering wheel is attaching assembly 34. As explained above, bolt 36 is preferably partially threaded. Bolt 36 freely passes through insulated first aperture 38 and through second aperture 39 before being threaded into a threaded aperture associated with the steering wheel.

The wireless floating horn switch of this invention preferably includes four attaching assemblies located at approximately evenly spaced intervals around the periphery of the mounting bracket 42. The four bolts associated with the four attaching assemblies will be threaded into four complementary threaded apertures in a steering wheel. An air-bag assembly is attached to mounting bracket 42. Mounting bracket 42 includes a plurality of apertures 50 complementary to attaching means located on the air-bag assembly. It is anticipated that the wireless floating horn switch of this invention can include an auxiliary circuit complementary to the air-bag assembly.

The horn of a vehicle having the assembled steering wheel of this invention is actuated, as shown in FIG. 3, by applying pressure to the air-bag assembly portion of the steering wheel. Applying pressure to the air-bag will cause mounting bracket 42 to move toward insulated base insert 30 causing pin 49 of activator 48 to move contact 44 into reversible contact with horn circuit 12 thereby completing the horn circuit and activating the horn. When the pressure is removed from the air-bag assembly, spring 40 urges mounting bracket 42 and activator 48 away from insulator base insert 30 thereby allowing contact 44 to move away from exposed access pad 31 opening the horn circuit as shown in FIG. 2.

The description above has been offered for illustrative purposes only, and it is not intended to limit the scope of the invention of this application which is defined in the following claims.

What I claim is:

1. A wireless floating horn switch comprising:

an insulated electrically conductive base insert having a ground circuit and a horn circuit;

an access pad in the base insert;

a first bracket extending in a direction parallel to the base insert at a vertically displaced distance therefrom;

at least one attaching assembly operatively connecting the base insert to the first bracket;

a biasing means arranged around the attaching assembly, the biasing means urging the first bracket away from the base insert; and a pin operatively connected to the first bracket and the attaching assembly, the pin constructed and arranged to reversibly strike the access pad on the base insert.

2. The wireless floating horn switch of claim 1 wherein the pin is constructed and arranged adjacent the attaching assembly to strike the access pad.

3. The wireless floating horn switch of claim 1 wherein the base insert and the first bracket are securable within a steering wheel assembly by the attaching assembly.

4. The wireless floating horn switch of claim 1 further comprising:

at least one additional exposed access pad located at a remote point from the access pad in the base insert.

5. The wireless floating horn switch of claim 1 wherein the base insert includes a plurality of integrally molded legs.

6. The wireless floating horn switch of claim 1 wherein the attaching assembly includes a metallic ring having tabs capable of mounting within tab holes and projecting from the ring is a contact arm capable of contacting the ground circuit.

7. The wireless floating horn switch of claim 1 wherein the first bracket supports an air bag assembly.

8. A wireless floating horn switch comprising:
   an insulated electrically conductive base insert having a ground circuit and a horn circuit insert molded therein;
   a plurality of exposed access pads in the base insert;
   a first bracket;
   a second bracket;
   at least one connector operativey connecting the base insert to each of the first bracket and the second bracket;
   a biasing means arranged around each of the at least one connectors, the biasing means urging the first bracket and the second bracket away from the base insert; and
   a pin operatively connected to the first bracket and/or the second bracket, each of the pins constructed and arranged to reversibly strike at least one of the plurality of access pads arranged on the base insert.

9. The wireless floating horn switch of claim 8 wherein the first bracket is substantially planar with the second bracket.

10. The wireless floating horn switch of claim 8 wherein the first bracket is substantially parallel to the second bracket.

11. The wireless floating horn switch of claim 8 wherein the first bracket and the second bracket support an air bag assembly.

12. The wireless floating horn switch of claim 8 wherein the first bracket is substantially parallel to a portion of the base insert and the second bracket is substantially parallel to another portion of the base insert.

13. The wireless floating horn switch of claim 8 wherein the base insert, the first bracket and the second bracket are securable within a steering assembly.

* * * * *